2,789,105

RUBBER WITH BASIC HYDROCARBON TIN COMPOUNDS

Louis A. Tomka, Westfield, N. J., and Elliott L. Weinberg, Long Island City, N. Y., assignors to Metal & Thermit Corporation, New York, N. Y., a corporation of New Jersey No Drawing. Application January 29, 1954
Serial No. 407,154

20 Claims. (Cl. 260—45.75)

The present invention relates to the stabilization of elastomers against degradation brought about by aging, especially of rubber compounds of the class consisting of natural rubber and rubbery synthetic polymers. Such properties of the elastomers as elongation, tensile strength, modulus, tackiness, surface cracking, etc., are adversely affected by aging in the absence of stabilizers normally termed rubber anti-oxidants.

It has been found that the incorporation of basic hydrocarbontin carboxylates, alkoxides and aryloxides, stabilize natural rubber and rubbery synthetic polymers in a highly effective manner.

Hydrocarbontin compounds of the general type

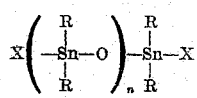

are particularly effective stabilizers against the degradation due to heat and/or light for natural rubber and rubbery synthetic polymers. In the above generalized formula for these hydrocarbontin stabilizers, R is a univalent organic radical, such as alkyl, aralkyl or aryl connected directly to the tin atom, and X is a negative radical selected from the group consisting of mono and poly carboxylates, alkoxides and aryloxides, the latter being similarly connected directly to the tin atom; $n$ is an integer.

These compounds may be prepared in any suitable manner. For example, they may be prepared in high yield and purity by reacting an hydrocarbontin compound with mono or poly carboxylic acids, alcohols and phenols and recovering the reaction product. More specifically, dihydrocarbontin oxide may be condensed with an appropriate amount of a mono or poly carboxylic acid, alcohol or phenol to produce products having the above formulas. A dihydrocarbontin halide (for example dibutyl tin dichloride prepared by reacting together butyl chloride, stannic chloride and sodium) may also be employed as the reactant with the mono or poly carboxylic acids, alcohols and phenols. These reactants are condensed in the presence of basic substances or alkaline neutralizing agents (hydrogen ion acceptors) such as oxides and hydroxides (e. g. sodium hydroxide).

Among the hydrocarbon tin derivatives that may be employed are those having methyl, ethyl, butyl, propyl, lauryl, tolyl, phenyl, phenylethyl, diphenyl or benzyl groups attached directly to tin atoms.

Among the mono carboxylates that may be employed are the formates, acetates, propionates, butyrates, valerates, caproates, heptylates, caprylates, pelargonates, laurates, palmitates and stearates.

Among the poly carboxylates that may be employed are the oxalates, maleates, malonates, succinates, glutarates, adipates, pimelates and suberates.

Among the alkoxides that may be employed are methoxide, ethoxide, propoxide, butoxide, pentoxide, hexoxide, heptoxide, octoxide, nonoxide and decoxide.

Among the aryloxides which may be employed are those derived from phenol, p-cresol, thymol, t-butylphenol, t-butylcresol and methylditerbutyl phenol.

The hydrocarbontin derivatives described above are extremely effective rubber stabilizers against the effects of light and/or heat, as demonstrated by their stabilizing ability at exceptionally low concentrations. Whereas many stabilizers require a concentration above two percent to be effective, the hydrocarbontin derivatives forming the subject matter of the present invention are effective at less than the 1 percent concentration level. These derivatives would normally be used in concentrations of 0.1 percent to 1.0 percent based on the weight of rubber, but .05 percent to 5 percent may also be used.

The hydrocarbontin derivatives described above do not cause discoloration of rubber stocks as do some stabilizers commonly employed. This property of the hydrocarbontin derivatives described above permits the manufacture of white stocks which do not discolor.

The hydrocarbontin derivatives described can be effectively used as stabilizers against light and/or heat with elastomers and more specifically with rubbery materials of the class consisting of:

(a) Natural rubber.
(b) Rubber-like copolymers of 1,3 butadiene and styrene (GR-S type)
(c) Rubber-like copolymers of 1,3 butadiene and acrylonitrile (nitrile type), and
(d) Rubber-like homopolymers of chloroprene (neoprene type)

The hydrocarbontin derivatives may be milled into the rubbery materials defined above without other additions for the purpose of preventing degradation during storage. More commonly, they will be incorporated with other materials during compounding.

Any suitable compounding formulation may be employed. A specific example of a natural rubber composition in which the hydrocarbontin derivatives described are effective as stabilizers against heat and/or light degradation is as follows:

| | Parts by weight |
|---|---|
| Thin, pale crepe | 100.0 |
| Zinc oxide (lead free) | 5.0 |
| Stearic acid | 1.0 |
| Titanium dioxide (anatase) | 10.0 |
| Insoluble sulfur | 3.0 |
| Benzothiazyl disulfide | 1.0 |
| Tetramethylthiuram disulfide | 0.1 |

To this composition may be added any of the hydrocarbontin derivatives set forth in the specific examples above in the proportions of 0.05 percent to 5 percent by weight, based on the weight of the rubber ingredient of said composition and preferably in the approximate 0.1 percent level. This compound rubber composition containing the stabilizer is worked and blended by conventional techniques and vulcanized at 275 degrees F. for 20 minutes in an hydraulic press.

The effectiveness of these hydrocarbontin derivatives as stabilizers is indicated by the following test results carried out with the specific rubber composition described above containing stabilizers in the amounts and manner shown below.

Example 1. No stabilizer
Example 2. Dibutyltin basic laurate, 0.5 pts. ($n=1$, cf. formula)
Example 3. Dibutyltin basic maleate, 0.25 pt. ($n=1$, cf. formula)
Example 4. Dibutyltin basic hexoxide, 0.25 pt. ($n=1$, cf. formula)
Example 5. Dibutyltin basic hexoxide, 0.1 pt. ($n=6$, cf. formula)
Example 6. Commercial anti-oxidant, 1 pt.

The test methods employed to determine the anti-oxidant properties consisted of (1) outdoor exposure and (2) the Oxygen Bomb Test—ASTM Procedure D-572-48. The outdoor exposure test samples were examined for tackiness, surface checking and discoloration. The oxygen bomb test samples were examined for changes in tensile strength, elongation and modulus with standard equipment.

The results of the tests on the examples described above were as follows:

*Outdoor exposure—60 days*

| Sample | Color | Tackiness | Surface Checking |
|---|---|---|---|
| Ex. 1 | No discoloration | Pronounced | Pronounced. |
| Ex. 2 | do | None | Very slight. |
| Ex. 3 | do | do | Do. |
| Ex. 4 | do | do | Do. |
| Ex. 5 | do | do | Do. |
| Ex. 6 | Discolored | Slight | Pronounced. |

*Oxygen bomb test—4 days @ 70° C.*

| Sample | Modulus (p. s. i.) 200% Elongation | | (p. s. i.) Tensile Strength | | Percent Elongation | |
|---|---|---|---|---|---|---|
|  | Orig. | Aged | Orig. | Aged | Orig. | Aged |
| Ex. 1 | 270 | 270 | 2,980 | 1,300 | 600 | 500 |
| Ex. 2 | 290 | 300 | 2,900 | 2,600 | 600 | 525 |
| Ex. 3 | 295 | 300 | 2,900 | 2,600 | 610 | 525 |
| Ex. 4 | 290 | 300 | 2,950 | 2,600 | 625 | 535 |
| Ex. 5 | 285 | 310 | 2,950 | 2,600 | 600 | 530 |
| Ex. 6 | 250 | 315 | 3,210 | 2,400 | 645 | 525 |

Similar tests on GR-S rubber (1,3 butadiene-styrene) indicate that the stabilization of synthetic rubber with organo-tin derivatives of the general type described, is just as pronounced as it is in the case of natural rubber.

Although the examples show the stabilizer used with natural rubber crepe and with coagulated GR-S (1,3 butadiene and styrene), incorporation of the stabilizer into latices is possible. The latices would then be processed in the usual manner.

The rubber composition to be stabilized may contain quantities of pigments to impart any desired color or decorative effect to the final product. The stabilizer will cause the rubber composition to maintain its color whether it is black, white or any other color.

While the invention has been described with reference to various examples and embodiments, it will be apparent to those skilled in the art that various modifications may be made and equivalents substituted therefor without departing from the principles and true nature of the invention.

What is claimed is:

1. A rubber composition comprising, as a basic ingredient, a rubbery polymer selected from the class consisting of natural rubber, copolymers of 1,3 butadiene and styrene, and copolymers of 1,3 butadiene and acrylonitrile and containing a stabilizing amount of a hydrocarbontin compound of the general formula:

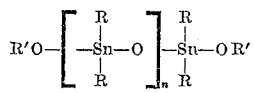

wherein $n$ is an integer having a value of at least 1, and R' is a radical selected from the group consisting of carboxy acyl radicals, hydrocarbon alkyl radicals and hydrocarbon aryl radicals, and R is selected from the group consisting of hydrocarbon alkyl, hydrocarbon aryl and hydrocarbon aralkyl radicals, the group R'O being bonded to tin through oxygen.

2. A composition according to claim 1, wherein the stabilizer is present in an amount of about 0.05% to 5% by weight, based on the rubber ingredients.

3. A composition according to claim 2, wherein the composition is cured.

4. A composition according to claim 1, wherein the stabilizer is present in an amount of about .1% to 1% by weight, based on the rubber ingredients.

5. A rubber composition comprising, as a basic ingredient, a copolymer of 1,3 butadiene and styrene and containing a stabilizing amount of a hydrocarbontin compound of the formula:

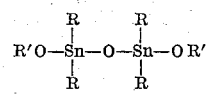

wherein R is a hydrocarbon alkyl radical, and R' is a carboxy acyl radical.

6. A composition according to claim 5, wherein the stabilizer is present in an amount of about 0.05% to 5% by weight, based on the rubber ingredients.

7. A rubber composition comprising, as a basic ingredient, a copolymer of 1,3 butadiene and styrene and containing a stabilizing amount of a hydrocarbontin compound of the general formula:

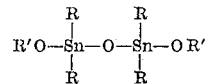

wherein R and R' are hydrocarbon alkyl radicals.

8. A composition according to claim 7, wherein the stabilizer is present in an amount of about 0.05% to 5% by weight, based on the rubber ingredients.

9. A rubber composition comprising, as a basic ingredient, a copolymer of 1,3 butadiene and styrene and containing a stabilizing amount of a hydrocarbontin compound of the general formula:

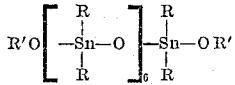

wherein R and R' are hydrocarbon alkyl radicals.

10. A composition according to claim 9, wherein the stabilizer is present in an amount of about 0.05% to 5% by weight based on the rubber ingredients.

11. A composition according to claim 5, wherein R is butyl and R' is lauroyl.

12. A composition according to claim 11, wherein the stabilizer is present in the amount of .1% to 1% by weight, based on the rubber ingredients.

13. A composition according to claim 5, wherein R is butyl and R' is the monovalent acyl radical of maleic acid.

14. A composition according to claim 13, wherein the stabilizer is present in an amount of about .1% to 1% by weight, based on the rubber ingredients.

15. A composition according to claim 7, wherein R is butyl and R' is hexyl.

16. A composition according to claim 15, wherein the stabilizer is present in an amount of about .1% to 1% by weight, based on the rubber ingredients.

17. A composition according to claim 9, wherein R is butyl and R' is hexyl.

18. A composition according to claim 17, wherein the stabilizer is present in an amount of about .1% to 1% by weight, based on the rubber ingredients.

19. The method which comprises curing the composition of claim 1.

20. A method according to claim 19, wherein the stabilizer is present in the amount of about 0.5% to 5% by weight, based on the rubber ingredients.

References Cited in the file of this patent

UNITED STATES PATENTS

| 2,476,661 | Hart | July 19, 1949 |
| 2,623,892 | Cleverdon et al. | Dec. 30, 1952 |
| 2,641,596 | Leistner et al. | June 9, 1953 |